March 27, 1956   J. W. HOLMAN   2,739,386
CLOTH MEASURING INSTRUMENT
Filed Oct. 27, 1952   2 Sheets-Sheet 1
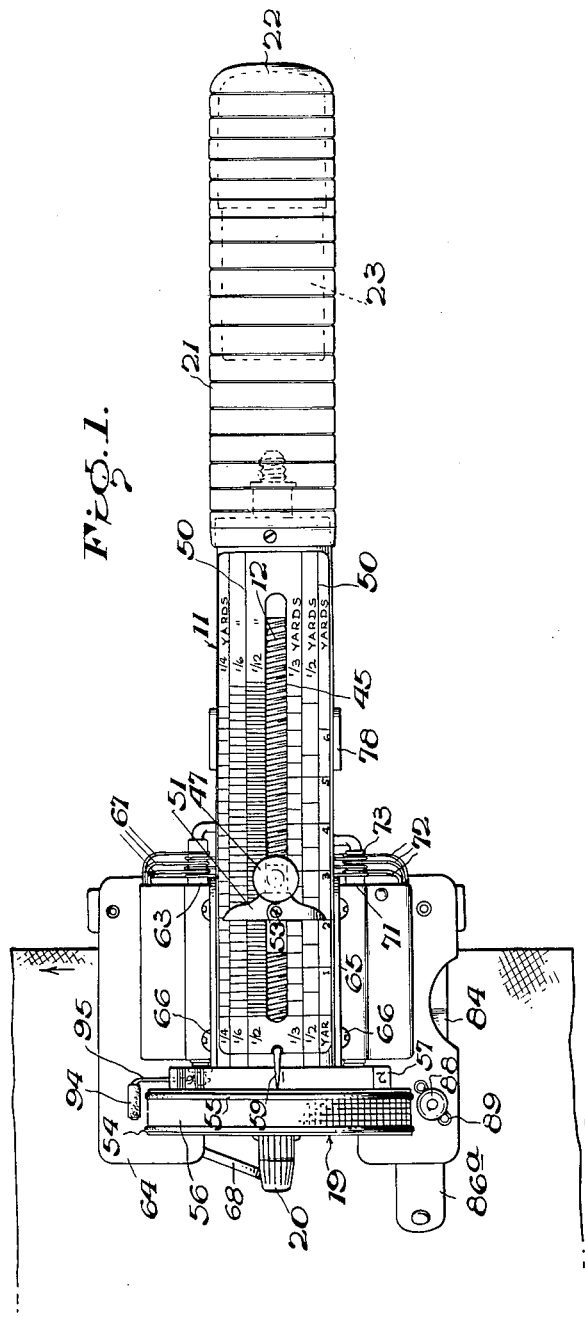
INVENTOR
John W. Holman.
BY
ATTORNEY March 27, 1956  J. W. HOLMAN  2,739,386
CLOTH MEASURING INSTRUMENT
Filed Oct. 27, 1952  2 Sheets-Sheet 2
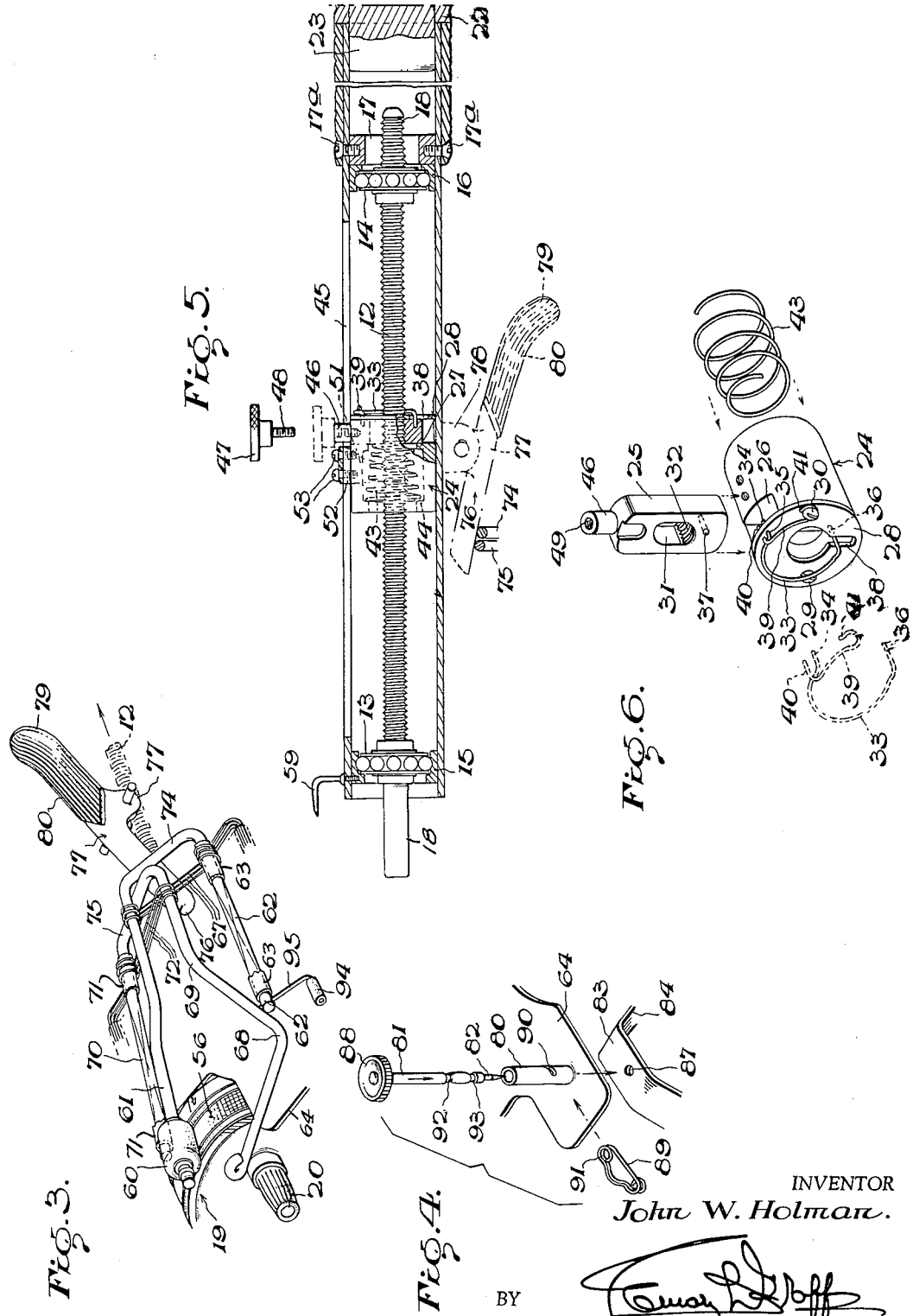
INVENTOR
John W. Holman.
BY
ATTORNEY

United States Patent Office 2,739,386
Patented Mar. 27, 1956

2,739,386
CLOTH MEASURING INSTRUMENT
John W. Holman, Wellington, Kans.
Application October 27, 1952, Serial No. 316,978
9 Claims. (Cl. 33—134)

This invention relates to cloth measurement and the general object thereof is the provision of an improved mechanical instrument for measuring cloth.

One of the objects of this invention is to provide a cloth measuring instrument which can be used either in a portable form by hand operation or in a stationary form affixed to a table or other suitable cloth supporting surface.

Another object of the invention is the provision of a cloth measuring instrument having a device for smoothing the cloth before it reaches the measuring elements so as to insure accurate measurements, particularly in the case of napped cloth.

A further object is the provision of improved means for presetting the instrument prior to use.

A still further object of the invention is the provision of such an instrument which is accurate, sturdy in construction and resistant to damage.

A still further object is the provision of such an instrument which is long wearing and which is not likely to get out of order for long periods of use.

These and other objects and advantages of the invention will appear more fully from the description which follows, considered together with the accompanying drawing.

In the drawing:

Figure 1 is a plan view of an embodiment of the invention.

Figure 2 is a side elevational view of the same embodiment.

Figure 3 is a bottom perspective view of the pressure roller, cloth smoothing element and members associated therewith.

Figure 4 is an exploded perspective view of the pin holder broken away from the instrument as a whole.

Figure 5 is a longitudinal section through the tubular housing portion of the instrument.

Figure 6 is an exploded rear perspective view of the slider member.

Referring with more particularity to the drawing in which like numerals designate like parts, the embodiment illustrated comprises a long tubular housing 11 along the longitudinal axis of which there is disposed a threaded shaft 12. The shaft is supported at the front end by a ball bearing assembly 13 and the rear end by a similar ball bearing assembly 14 of any suitable type, although any other suitable anti-friction mounting means may be employed.

The outer race 15 of the front bearing assembly is driven into the tubular housing 11 and is frictionally held flush with the front end. The outer race 16 of the rear bearing assembly is held in position by a retaining ring 17, the latter being held by screws 17a passing radially through the housing on opposite sides and threadedly engaging apertures in the ring 17, as shown.

The shaft 12 has a front extension 18 projecting beyond the front end of the housing to receive the measuring wheel 19 which is frictionally mounted thereon for rotation therewith. The extension 18 passes through a central aperture in the wheel 19 and projects a short distance forwardly to receive a rubber knob 20 which facilitates manual rotation of the wheel, the purpose of which will be explained more fully hereinafter.

A cylindrical sheath 21 fits over the rear end of the housing 11 and may be of rubber, plastic, or other suitable material with knurlings to form a hand grip for the instrument. The sheath is held in place by a knob 22 which has a reduced portion 23, the latter being plugged into the rear end of the housing and held therein by frictional engagement.

Within the housing, between the front and rear bearing assemblies, there is disposed a slider, generally designated by the numeral 24. The slider is of a generally cylindrical shape to slidably engage the interior surface of the housing 11.

At the rear end of the slider there is mounted a vertical reciprocating member 25 in a vertical slot or guideway 26. The member 25 is held between an inner flange 27 of the slider and a rear plate 28, the latter being attached to the back of the slider by means of screws 29 and 30. The member 25 has a vertically elongated opening 31 surrounding the shaft 12. The bottom of the opening 31 has discontinuous threads 32 to register with and engage the threads along the bottom of the shaft 12. Accordingly, when the threads 32 are in engagement with the threads of the shaft, rotation of the shaft will cause the member 25 as well as the entire slider 24 to be translated axially in the housing.

The opening 31 is sufficiently elongated so that in its downward position relative to the shaft 12 the threads 32 are disengaged from the shaft threads.

The threads 32 are normally held in engagement with the shaft threads by an arcuate wire spring 33. The upper end 34 of the spring is disposed in an aperture 35 at the top of the plate 28 and the lower end 36 is disposed in an aperture 37 of the member 25 below the slot 31. A notch 38 in the plate is provided for the movement of the lower end of the spring. The spring is held in this position by a short wire 39 which lies across the upper end of the spring, one end of the wire being inserted in a hole 40 of the plate 28 and the other end 41 being secured to the plate by means of the screw 30 about which it is hooked.

A light coil spring 43 is disposed between the front of member 25 and an inner flange 44 within the slider 24 to urge the member 25 rearwardly and hence take up any wear or slack between it and the plate 28.

Along the top of the tubular housing 11 a longitudinal slot 45 is provided and a boss 46 at the top of the member 25 projects upwardly through the slot. A thumb button 47 has a shank 48 threadedly engaged with an aperture 49 in the boss by means of which the member 25 may be manually depressed against the action of the spring 33 to disengage the threads 32 from those of the shaft 12.

Adjacent the slot 45 there is placed a group of coextensive scales 50 of any desired units. The drawing illustrates the scales in yards. One scale is subdivided in units of whole yards, another in ½ yards, and the others in ⅓, ¼, ⅙ and ¹⁄₁₂ yards, respectively. However, scales of other units and of other subdivisions may be used.

An index member 51 extends transversely over all the scales and has a lug 52 projecting from the bottom which fits into the slot 45 and rests on top of the slider 24 to which it is secured by means of screws 53 and serving thereby to indicate the position of the slider relative to the scales 50.

The peripheral surface of the wheel 19 comprises a pair of spaced bands 54 and 55 of rubber or other suitable material having a high coefficient of friction. In the space between the bands is disposed a knurled metallic band 56 of slightly smaller diameter than the bands 54 and 55. This arrangement results in a firm and positive grip on the cloth material being measured and practically insures no slippage therebetween.

The inner side of the wheel 19 carries a circular flange 57 of reduced diameter upon which there is delineated an annular scale 58 for accurate measurement in fractions of the unit of measurement employed. The drawing illustrates the scale 58 having inch subdivisions. A reference index in the form of a pointer 59 is secured to the front of the housing 11 and projects over the scale 58.

In order to hold the cloth being measured against the measuring wheel 19 a presser roller 60 is mounted on the bottom of the device. The roller is preferably of rubber or other suitable material having a high coefficient of friction with cloth, and is rotatably mounted on the front end of a shaft 61. The rear end of the shaft is bent in the shape of a U to provide an offset pivot arm 62 which is rotatably mounted in an elongated bearing 63 of a plate 64. The plate is mounted on the bottom at the front end of the tubular housing 11 by means of a bracket 65. The bottom of the bracket is secured to the plate 64. The top of the bracket is semi-cylindrical to fit against the bottom of the housing 11 and is secured thereto by screws 66. In normal use the cloth to be measured is moved along the bottom of the plate between the wheel 19 and roller 60. The roller is biased toward the wheel by means of a group of wire springs 67, one end of which is secured about the bearing 63 and anchored with plate 64, the other or free end being connected to the shaft 61.

Coacting with the presser roller 60 is a stiff V-shaped wire member 68, the function of which is to smooth out the cloth just before entering between the wheel 19 and roller 60. The V-shaped member is at the end of an arm 69 on the lead side of the roller 60, the point of the V facing in the direction away from the roller. The other end of the arm 69 is bent in the form of a U to provide an offset shaft 70 which is rotatably mounted in an elongated bearing 71 similar to the bearing 63, one of these bearings being on the one side of the bracket 65 and the other on the other side, as shown.

The V-shaped member 68 is biased against the bottom of the plate 64 by a group of wire springs 72, one end 73 of which is secured about the bearing 71 and anchored to the plate 64 and the other or free end being connected to the shaft 69. The webs 74 and 75 of the said U-shaped members associated with the shafts 62 and 70, respectively, cross each other at the back of the plate and are engaged on top by the forward arm 76 of a lever 77. The lever is pivoted to a bracket 78 on the bottom of the housing 11 and its rear arm 79 has a pad 80 of rubber or other suitable material for the forefinger of the operator. By means of this arrangement it will be seen that when the operator presses the rear arm 79 towards the housing, the forward arm 76 will be depressed and force the web members 74 and 75 downwardly, thereby rotating the shafts 62 and 70 with the result that both the V-shaped member 68 and the roller 60 will be forced downward against the action of their respective springs 72 and 67 and thereby open a space between the roller 60 and the wheel 19 and between the V-shaped member 68 and the bottom of the plate 64 for the reception of the cloth to be measured. Upon release of the lever 77 the roller 60 and the V-shaped member 68 return to their normally biased positions under the action of the said springs 68 and 72.

On one side of the plate 64 a pin holder is provided which comprises a vertical tubular sleeve 80 mounted over an aperture in the plate. A shaft 81 having a pin 82 at the bottom thereof is slidably mounted in the sleeve. Directly below the plate under the sleeve 80 is a flat horizontal member 83 forming part of a bent arm 84 attached to a transverse stiffening bracket 85 across the back of plate 64. The member 83 is spaced from the bottom of the plate 64 to permit the cloth being measured to slide therethrough and in this respect acts as a support for the cloth while it is being fed through the instrument. The arm 84 has a degree of resiliency in order that thicker pieces of material may be accommodated between it and the bottom of the plate 64 and said member 84 is braced by a bar 86 extending between and connected to its forward end 86a and the stiffening bracket 85.

A pin hole 87 is provided through the member 83 directly in line with the pin 82 so that when the shaft 81 is depressed downwardly it will pass through any cloth between the plate and the member 83 and enter the pin hole 87, thereby holding the cloth in fixed position on the instrument. The pin is released from the cloth by moving the shaft 81 upward, a finger button 88 being provided for this purpose at the top of said shaft. The shaft 81 is held in this released position by means of a resilient bar 89 which is set in a slot 90 cut partway through the sleeve 80. The bar 89 comprises one side of an elliptically bent resilient wire member 91, the other side of said member 91 bearing against the sleeve 80 on the side opposite the slot 90. The shaft 81 is provided with two circumferential grooves 92 and 93 for engaging the bar 89, one for the upper or released position of the pin 82 and the other for its lower or holding position, whereby the pin is positively held in the sleeve in either of these two positions.

The portion of the shaft 81 between the two grooves 92 and 93 is somewhat rounded longitudinally to facilitate moving the shaft from one position to the other while it is in engagement with the bar 89.

To use the instrument the arm 79 of the lever 77 is pressed toward the tubular housing 11 to move the roller 60 away from the wheel 19 and the V-shaped member 68 away from the bottom of the plate. The cloth is then inserted along the bottom of the plate 64 and the lever 77 released. The shaft 81 may be depressed at this time to hold the cloth in place while the slider 24 is set to the zero position of the scales 50. This is done by depressing the knob 47 to free the threads 32 from the shaft 12 and then sliding the slider along the slot 45 until the indexed marker 51 is at its extreme forward position. The knob 47 is then released to permit the threads 32 to engage the threads on the bottom of the shaft 12. The shaft 81 is then elevated to release the cloth. The material is then run through the instrument until the index marker 51 reaches the desired number on the scales representing the amount of cloth to be measured. Then the shaft 81 is again depressed to hold the cloth in place while the latter is being marked or cut.

In setting the instrument prior to running the cloth through it the wheel 19 should be turned with the zero line of the scale 58 directly below the pointer 59. For accurate measurements, this line is used as a reference to stop the cloth. This adjustment is facilitated by the use of the knob 20. The scale 58 is also used for accurately measuring fractional units intermediate those provided on the scales 50.

A brake member 94 is mounted at the outer end of a crank arm 95 adjacent one side of the wheel 19. The inner end of the crank arm is mounted for rotation with the shaft 62 which extends forwardly through its bearing 63. Consequently when the lever 77 is actuated to force the roller 60 away from the wheel 19, the brake member 94 is engaged with the wheel 19 and holds it against rotation.

The embodiment described above may be used as a portable instrument or it may be attached by a bracket (not shown) or other suitable device to a horizontal surface, such as a table or counter where cloth measurement is frequently done, as a permanent installation.

I claim:

1. A cloth measuring instrument comprising an elongated tube, a threaded shaft axially disposed and rotatably mounted in said tube, a slider in said tube, said slider being supported by the interior wall of the tube independently of the shaft, a threaded member carried by said slider, biasing means normally urging said threaded member to engagement with said shaft, said tube having a longitudinal slot therethrough, a measuring scale on the exterior of said tube adjacent said slot, an index member adjacent said scale, said index member being attached to said slider for longitudinal movement therewith, means for disengaging said threaded member from said shaft against the action of said biasing means, said disengaging means including a knob on the exterior of the tube connected to the threaded member, a measuring wheel on the exterior of the tubular member connected to said shaft for rotation therewith, and means for holdnig cloth to be measured against said wheel.

2. A cloth measuring instrument comprising an elongated tube, a threaded shaft axially disposed and rotatably mounted in said tube, a slider in said tube, said slider being supported by the interior wall of the tube independently of the shaft, a reciprocating member carried by said slider, said reciprocating member having an elongated aperture for the passage therethrough of said shaft, said aperture having threaded formations at one end thereof to engage the shaft threads, resilient means biasing said reciprocating means to the position of engagement of the threaded formations with the shaft threads, said tube having a longitudinal slot therethrough, a measuring scale on the exterior of said tube adjacent said slot, an index member adjacent said scale, said index member being attached to said slider for longitudinal movement therewith, means for disengaging said threaded member from said shaft against the action of said biasing means, said disengaging means including a knob on the exterior of the tube connected to the threaded member, a measuring wheel on the exterior of the tubular member connected to said shaft for rotation therewith, and means for holding cloth to be measured against said wheel.

3. A cloth measuring instrument comprising an elongated tube, a threaded shaft axially disposed and rotatably mounted in said tube, a slider in said tube, said slider being supported by the interior wall of the tube independently of the shaft, a threaded member carried by said slider, biasing means normally urging said threaded member to engagement with said shaft, said tube having a longitudinal slot therethrough, a measuring scale on the exterior of said tube adjacent said slot, an index member adjacent said scale, said index member being attached to said slider for longitudinal movement therewith, means for disengaging said threaded member from said shaft against the action of said biasing means, said disengaging means including a knob on the exterior of the tube connected to the threaded member, a measuring wheel on the exterior of the tube connected to said shaft for rotation therewith, a press roller for holding cloth to be measured against said wheel, a U-shaped member having one arm rotatably supporting said roller and the other arm rotatably mounted in a bearing secured to the tube, resilient means urging rotation of said U-shaped member to bias the roller against the wheel, and means for rotating said U-shaped member in the opposite direction against the action of said resilient means.

4. A cloth measuring instrument comprising an elongated tube, a threaded shaft axially disposed and rotatably mounted in said tube, a slider in said tube, a threaded member carried by said slider, biasing means normally urging said threaded member to engagement with said shaft, said tube having a longitudinal slot therethrough, a measuring scale on the exterior of said tube adjacent said slot, an index member adjacent said scale, said index member being attached to said slider for longitudinal movement therewith, means for disengaging said threaded member from said shaft against the action of said biasing means, said disengaging means including a knob on the exterior of the tube connected to the threaded member, a measuring wheel on the exterior of the tubular member connected to said shaft for rotation therewith, a press roller for holding cloth to be measured against said wheel, a U-shaped member having one arm rotatably supporting said roller and another arm rotatably mounted in a bearing secured to the tube, resilient means urging rotation of said U-shaped member to bias the roller against the wheel, a second U-shaped member having one of its arms rotatably mounted in another bearing secured to the tube and its other arm extending on the lead side of said roller in reference to the direction in which the cloth to be measured normally moves, a platen secured to the tube adjacent said other arm, resilient means urging rotation of said second U-shaped member to bias said other arm against the platen, and means for corotating said U-shaped members against the action of their respective resilient means.

5. A cloth measuring instrument comprising an elongated tube, a threaded shaft axially disposed and rotatably mounted in said tube, a slider in said tube, a threaded member carried by said slider, biasing means normally urging said threaded member to engagement with said shaft, said tube having a longitudinal slot therethrough, a measuring scale on the exterior of said tube adjacent said slot, an index member adjacent said scale, said index member being attached to said slider for longitudinal movement therewith, means for disengaging said threaded member from said shaft against the action of said biasing means, said disengaging means including a knob on the exterior of the tube connected to the threaded member, a measuring wheel on the exterior of the tubular member connected to said shaft for rotation therewith, a shiftable press roller for holding cloth to be measured against said wheel, a U-shaped member having one of its arms rotatably mounted in a bearing secured to the tube and its other arm extending on the lead side of said roller in reference to the direction in which the cloth to be measured normally moves, a platen secured to the tube adjacent said other arm, resilient means urging rotation of said U-shaped member against the platen.

6. A cloth measuring instrument as defined by claim 4 in which the said other arm of the second U-shaped member has a V-shaped configuration, the apex of the V facing in the direction away from the lead side of the roller.

7. In a cloth measuring instrument having a measuring wheel and a platen associated with said wheel for guiding the cloth to be measured, a member having a supporting surface for the cloth in spaced relation to the platen, a sleeve secured to the platen with its axis at right angles to the plane of the platen, said platen and supporting surface having apertures therethrough aligned with the sleeve, a shaft slidably mounted for reciprocation in the sleeve, a pin secured to the shaft, and means for releasably holding said shaft in different positions in said sleeve.

8. A cloth measuring instrument as defined by claim 4 having friction means on the periphery of the wheel, said means comprising a knurled band encircling the wheel and a pair of spaced rubber bands also encircling the wheel, the diameter of said rubber bands being slightly in excess of the diameter of the knurled band.

9. A cloth measuring instrument as defined by claim 4 and a brake member for the measuring wheel, said brake member being connected to one of the U-shaped members for coaction therewith.

References Cited in the file of this patent

UNITED STATES PATENTS

| | | |
|---|---|---|
| 40,962 | Swany | Dec. 15, 1863 |
| 62,398 | Couse | Feb. 26, 1867 |
| 645,652 | Webber | Mar. 20, 1900 |
| 1,379,159 | Baldwin | May 24, 1921 |
| 1,383,340 | Robbins et al. | July 5, 1921 |
| 1,401,913 | Lorraine | Dec. 27, 1921 |
| 1,450,268 | Turner | Apr. 3, 1923 |
| 1,759,992 | McCarthy | May 27, 1930 |
| 2,092,544 | Woodruff | Sept. 7, 1937 |
| 2,233,530 | Holman | Mar. 4, 1941 |